(12) United States Patent
Shimada et al.

(10) Patent No.: US 10,838,181 B2
(45) Date of Patent: Nov. 17, 2020

(54) ZOOM LENS AND IMAGING APPARATUS

(71) Applicant: FUJIFILM Corporation, Tokyo (JP)

(72) Inventors: Yasutaka Shimada, Saitama (JP); Takuya Tanaka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 176 days.

(21) Appl. No.: 16/110,155

(22) Filed: Aug. 23, 2018

(65) Prior Publication Data

US 2018/0364461 A1 Dec. 20, 2018

Related U.S. Application Data

(63) Continuation of application No. PCT/JP2016/080992, filed on Oct. 19, 2016.

(30) Foreign Application Priority Data

Mar. 16, 2016 (JP) ................. 2016-052014

(51) Int. Cl.
*G02B 15/14* (2006.01)
*G02B 15/163* (2006.01)
(Continued)

(52) U.S. Cl.
CPC ............. *G02B 15/163* (2013.01); *G02B 9/64* (2013.01); *G02B 13/04* (2013.01); *G02B 13/18* (2013.01); *G02B 15/167* (2013.01)

(58) Field of Classification Search
CPC ........ G02B 15/163; G02B 9/64; G02B 13/04; G02B 13/18; G02B 15/167
(Continued)

(56) References Cited

U.S. PATENT DOCUMENTS 5,966,246 A 10/1999 Yoshikawa
2003/0007256 A1 1/2003 Usui et al.
(Continued)

FOREIGN PATENT DOCUMENTS

JP H06-242378 A 9/1994
JP H10-62686 A 3/1998
(Continued)

OTHER PUBLICATIONS

An Office Action mailed by the Japanese Patent Office dated Jul. 31, 2018, which corresponds to Japanese Patent Application No. 2018-505223 and is related to U.S. Appl. No. 16/110,155.
(Continued)

*Primary Examiner* — William Choi
(74) *Attorney, Agent, or Firm* — Studebaker & Brackett PC

(57) ABSTRACT

The zoom lens consists of, in order from the object side, a positive first lens group G1, a negative second lens group G2, a negative third lens group G3, a stop, and a positive fourth lens group G4. During zooming, the first lens group G1 and the fourth lens group G4 remain stationary, and the second lens group G2 and the third lens group G3 move. The first lens group G1 consists of, in order from the object side, a negative first lens group front group G1A that remains stationary during focusing, a positive first lens group intermediate group G1B that moves during focusing, and a positive first lens group rear group G1C that remains stationary during focusing. The following conditional expression relating to an Abbe number vn1A2 of the second negative lens from the object side is satisfied: 65<vn1A2<110.

20 Claims, 7 Drawing Sheets

(51) Int. Cl.
  *G02B 13/18*  (2006.01)
  *G02B 15/167*  (2006.01)
  *G02B 9/64*  (2006.01)
  *G02B 13/04*  (2006.01)

(58) Field of Classification Search
  USPC .................................... 359/682, 686, 688
  See application file for complete search history.

(56) References Cited

U.S. PATENT DOCUMENTS

2015/0015969 A1  1/2015  Komatsu et al.
2015/0131164 A1  5/2015  Wakazono et al.

FOREIGN PATENT DOCUMENTS

| JP | 2001-021804 A | | 1/2001 |
| JP | 2015-018156 A | | 1/2015 |
| JP | 2015-094866 A | | 5/2015 |
| JP | 2015-094867 A | | 5/2015 |
| JP | 2015-094868 A | | 5/2015 |
| JP | 2015094868 A | * | 5/2015 |

OTHER PUBLICATIONS

International Search Report issued in PCT/JP2016/080992; dated Nov. 29, 2016.
International Preliminary Report on Patentability and Written Opinion issued in PCT/JP016/080992; dated Sep. 18, 2018.

* cited by examiner

FIG. 1
EXAMPLE 1
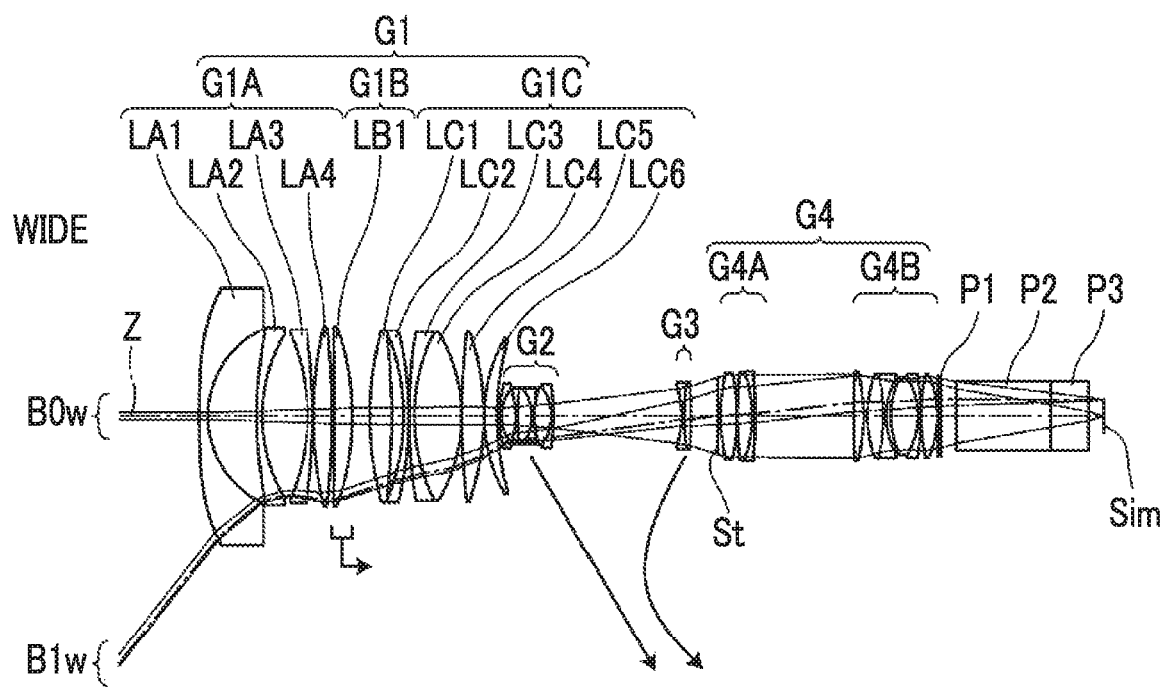
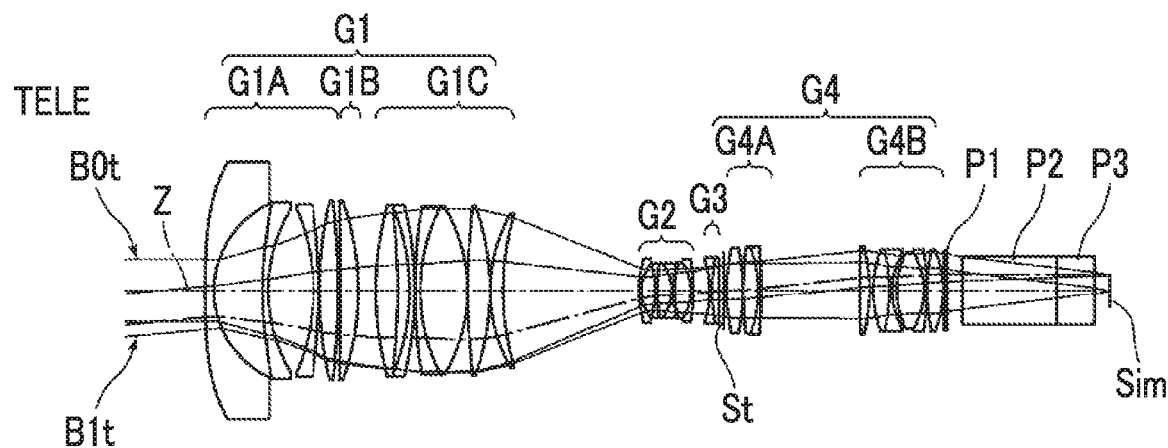

FIG. 2
EXAMPLE 2
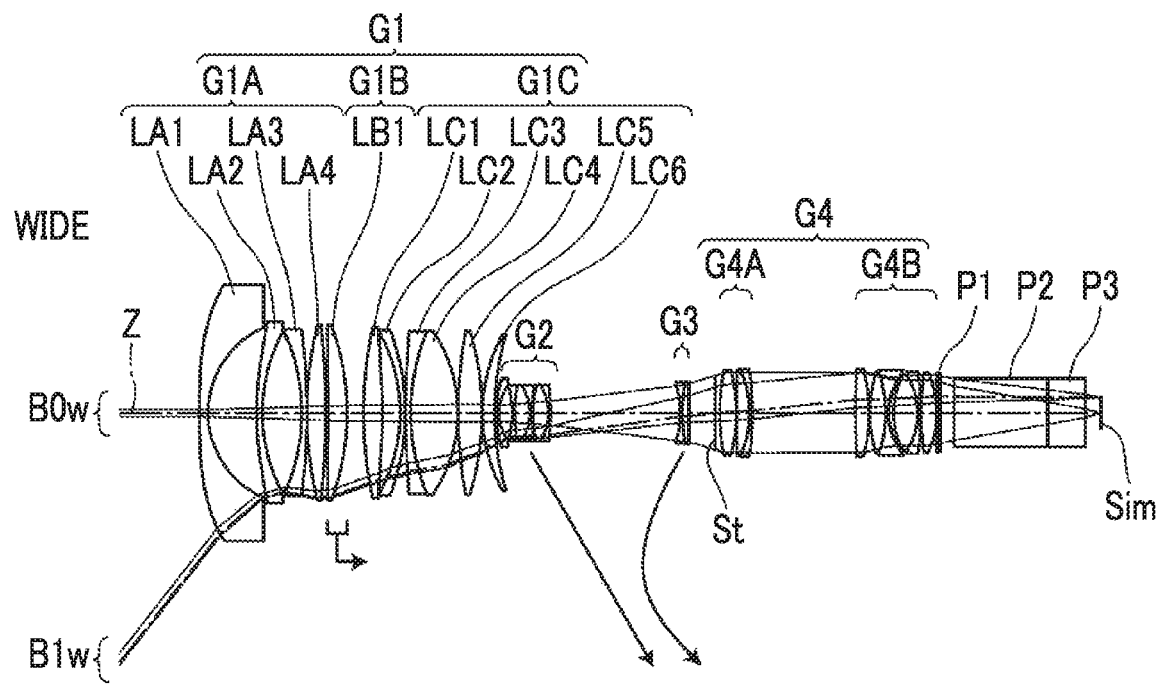
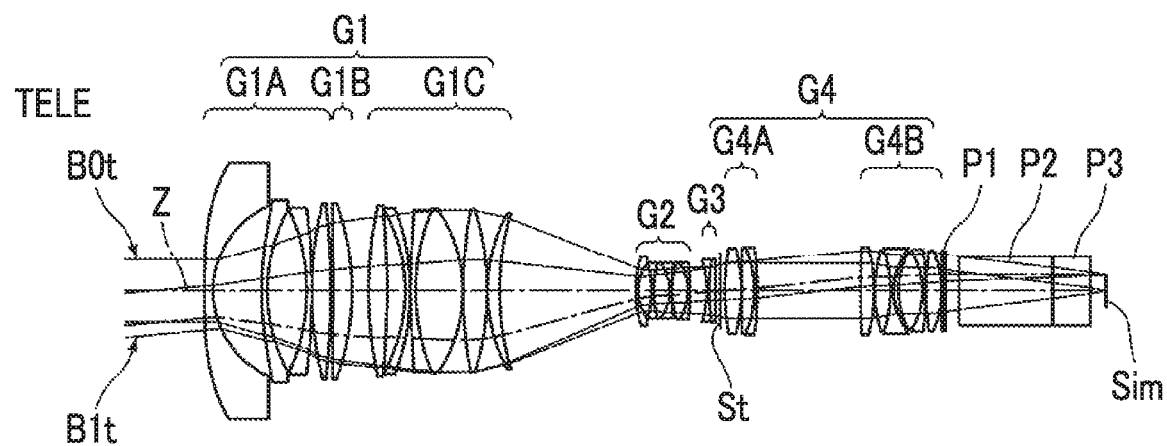

FIG. 3
EXAMPLE 3
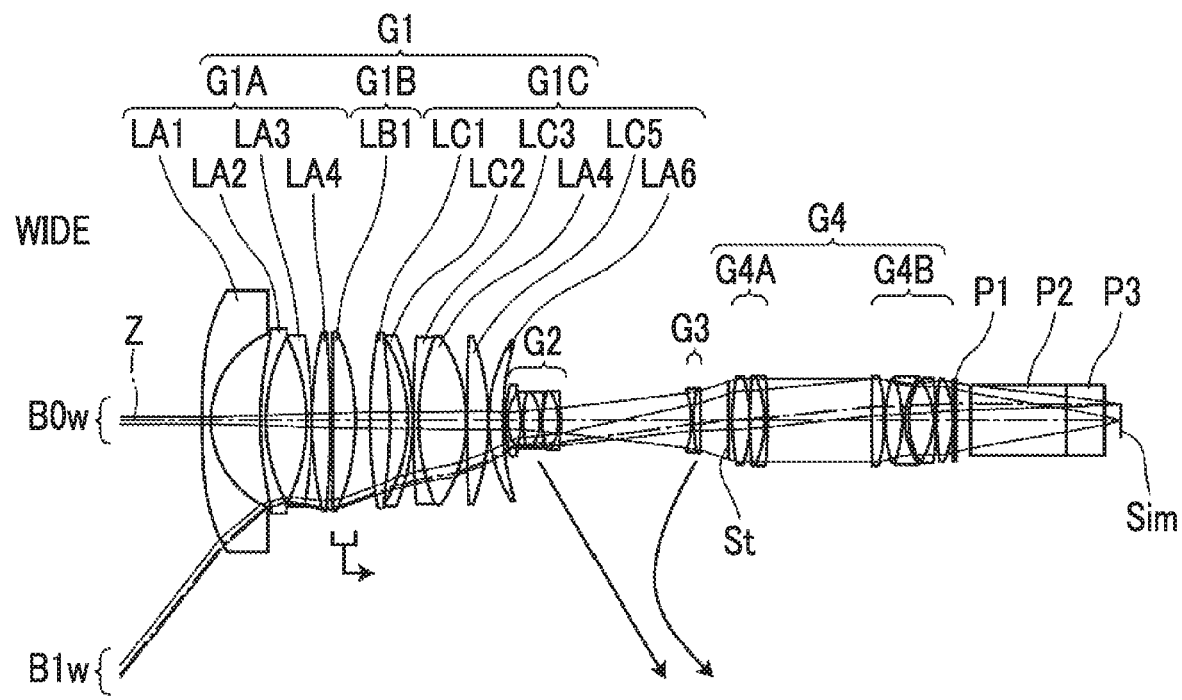
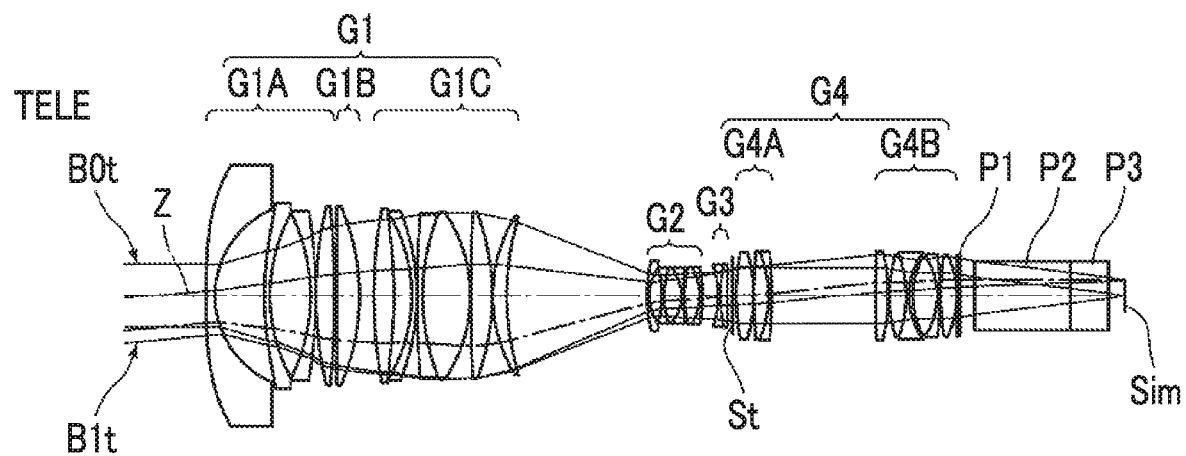

ZOOM LENS AND IMAGING APPARATUS

CROSS-REFERENCE TO RELATED APPLICATIONS

This application is a Continuation of PCT International Application No. PCT/JP2016/080992 filed on Oct. 19, 2016, which claims priority under 35 U.S.C § 119(a) to Japanese Patent Application No. 2016-052014 filed on Mar. 16, 2016. Each of the above application(s) is hereby expressly incorporated by reference, in its entirety, into the present application.

BACKGROUND OF THE INVENTION

1. Field of the Invention

The present invention relates to a zoom lens suitable for movie imaging cameras, broadcast cameras, digital cameras, video cameras, and/or surveillance cameras, and to an imaging apparatus comprising the zoom lens.

2. Description of the Related Art

Recently, a movie production method of digitally performing movie imaging by using a high definition digital video camera without using a movie film has been developed and started to be actually used. A system using such a movie production method is called an electronics cinema (e-cinema). An imaging lens used for a camera for e-cinema is required to have performance equal to or higher than that of an imaging lens for a high definition television (HDTV) camera. In most cases, wide-angle type lenses used for cameras for HDTV and/or e-cinema are fixed-focus type lenses from the viewpoint of optical performance, and plural lenses are additionally used in accordance with the application. However, particularly in the field of movie imaging and commercial imaging, a wide-angle type zoom lens, which is configured such that one zoom lens serves as several fixed-focus type lenses frequently used on the wide-angle side, has been preferred from the viewpoint of usability.

As a known wide-angle type zoom lens, for example, there are lenses described in JP1994-242378A (JP-H06-242378A), JP1998-62686A (JP-H10-62686A), and JP2015-94867A. JP1994-242378A (JP-H06-242378A), JP1998-62686A (JP-H10-62686A), and JP2015-94867A each describe a zoom lens comprising, in order from the object side, a lens group that has a focusing function, remains stationary during zooming, and has a positive refractive power, two or more lens groups that move during zooming, and a lens group that remains stationary during zooming and has a positive refractive power.

SUMMARY OF THE INVENTION

As described above, in particular in the fields of movie imaging and commercial imaging, there is a demand for a wide-angle type zoom lens from the point of usability. Therefore, it is desired to develop a wide-angle type zoom lens having favorable performance suitable for use in these fields. However, it is difficult to correct lateral chromatic aberration particularly in wide-angle systems. In the wide-angle type zoom lenses described in JP1994-242378A (JP-H06-242378A), JP1998-62686A (JP-H10-62686A), and JP2015-94867A, it cannot be said that particularly performance of lateral chromatic aberration at the wide-angle is sufficient for a lens system in applications such as recent HDTV requiring high resolving power.

The present invention has been made in consideration of the above-mentioned situations, and it is an object of the present invention to provide a zoom lens, which has a wide angle and has favorable optical performance by suppressing lateral chromatic aberration, and an imaging apparatus comprising the zoom lens.

A zoom lens of the present invention consists of, in order from an object side: a first lens group that has a positive refractive power and remains stationary with respect to an image plane during zooming; a second lens group that has a negative refractive power and moves in a direction of an optical axis during zooming; a third lens group that has a negative refractive power and moves in the direction of the optical axis during zooming; a stop; a fourth lens group that has a positive refractive power and remains stationary with respect to the image plane during zooming. The first lens group includes, in order from the object side, a first lens group front group that has a negative refractive power and remains stationary with respect to the image plane during focusing, a first lens group intermediate group that has a positive refractive power and moves to the image side during focusing from a distant object to a close-range object, and a first lens group rear group that has a positive refractive power and remains stationary with respect to the image plane during focusing. The first lens group front group has a plurality of negative lenses that are arranged successively from a position closest to the object side, and a positive lens that is disposed to be closest to the image side. The first lens group rear group has one or more negative lenses concave toward the object side. In addition, Conditional Expression (1) is satisfied.

$$65 < vn1A2 < 110 \tag{1}$$

Here, $vn1A2$ is an Abbe number of a second negative lens from the object side in the first lens group front group at the d line.

In the zoom lens of the present invention, it is preferable to satisfy Conditional Expression (1-1).

$$70 < vn1A2 < 100 \tag{1-1}$$

Here, $vn1A2$ is an Abbe number of the second negative lens from the object side in the first lens group front group at the d line.

It is preferable that the zoom lens of the present invention satisfies Conditional Expression (2), and it is more preferable that the zoom lens satisfies Conditional Expression (2-1).

$$18 < vn1Aa - vp1Aa < 40 \tag{2}$$

$$23 < vn1Aa - vp1Aa < 35 \tag{2-1}$$

Here, $vn1Aa$ is preferably an average of Abbe numbers of the negative lenses in the first lens group front group at the d line, and $vp1Aa$ is preferably an average of Abbe numbers of the positive lenses in the first lens group front group at the d line in a case where the first lens group front group has a plurality of positive lenses, and an Abbe number of the positive lens at the d line in a case where the first lens group front group has only one positive lens.

In the zoom lens of the present invention, it is preferable that the first lens group rear group has, successively in order from the position closest to the object side, a biconvex lens, and a negative meniscus lens concave toward the object side.

In the zoom lens of the present invention, the first lens group front group may be configured to include, in order from the object side, two negative meniscus lenses convex toward the object side, a negative lens, and a positive lens.

In the zoom lens of the present invention, it is preferable that the first lens group rear group includes, in order from the object side, a biconvex lens, a negative meniscus lens concave toward the object side, a cemented lens in which a negative lens and a positive lens are cemented in order from the object side, and one or more positive lenses. In this case, the first lens group rear group may be configured to include six lenses.

In the zoom lens of the present invention, the first lens group intermediate group may be configured to include only one positive lens.

In the zoom lens of the present invention, it is preferable that a lens surface closest to the object side in the first lens group front group has an aspheric shape which has a positive refractive power in the vicinity of the optical axis such that the positive refractive power is stronger at a position closer to a peripheral portion of the lens surface than the vicinity of the optical axis. In addition, it is preferable that one of lens surfaces included in the first lens group rear group has an aspheric shape which has a positive refractive power in the vicinity of the optical axis such that the positive refractive power is weaker at a position closer to a peripheral portion of the lens surface than the vicinity of the optical axis.

In the zoom lens of the present invention, it is preferable that the fourth lens group includes a lens surface having an aspheric shape which has a positive refractive power in the vicinity of the optical axis at a position closer to the object side than an air gap largest in the fourth lens group such that the positive refractive power is weaker at a position closer to a peripheral portion of the lens surface than the vicinity of the optical axis.

An imaging apparatus of the present invention comprises the zoom lens of the present invention.

In the present specification, it should be noted that the term "substantially consisting of ~" and "substantially consists of ~" means that the imaging lens may include not only the above-mentioned elements but also lenses substantially having no refractive powers, optical elements, which are not lenses, such as a stop, a mask, and/or a cover glass, and mechanism parts such as a lens flange, a lens barrel, and/or a camera shaking correction mechanism.

In addition, the term "~ lens group that has a positive refractive power" means that the lens group has a positive refractive power as a whole. It is the same for the term "~ lens group that has a negative refractive power". Reference signs of refractive powers of the lens groups, reference signs of refractive powers of the lenses, and surface shapes of the lenses are assumed as those in paraxial regions in a case where some lenses have aspheric surfaces. The "lens group" is not necessarily composed of a plurality of lenses, but may be composed of only one lens. The "negative meniscus lens" means a lens that has a meniscus shape and has a negative refractive power.

According to the present invention, the zoom lens consists of, in order from an object side: a first lens group that has a positive refractive power and remains stationary during zooming; a second lens group that has a negative refractive power and moves during zooming; a third lens group that has a negative refractive power and moves during zooming; a stop; a fourth lens group that has a positive refractive power and remains stationary during zooming. In the zoom lens, a part of the first lens group moves during focusing, a configuration of the first lens group is set in detail so as to satisfy conditional expressions relating to the Abbe numbers of the lenses in the first lens group. Therefore, it is possible to provide a zoom lens, which has a wide angle and has favorable optical performance by suppressing lateral chromatic aberration, and an imaging apparatus comprising the zoom lens.

BRIEF DESCRIPTION OF THE DRAWINGS

FIG. 1 is a cross-sectional view illustrating a configuration and an optical path of a zoom lens of Example 1 of the present invention.

FIG. 2 is a cross-sectional view illustrating a configuration and an optical path of a zoom lens of Example 2 of the present invention.

FIG. 3 is a cross-sectional view illustrating a configuration and an optical path of a zoom lens of Example 3 of the present invention.

DESCRIPTION OF THE PREFERRED EMBODIMENTS

Figure 4:
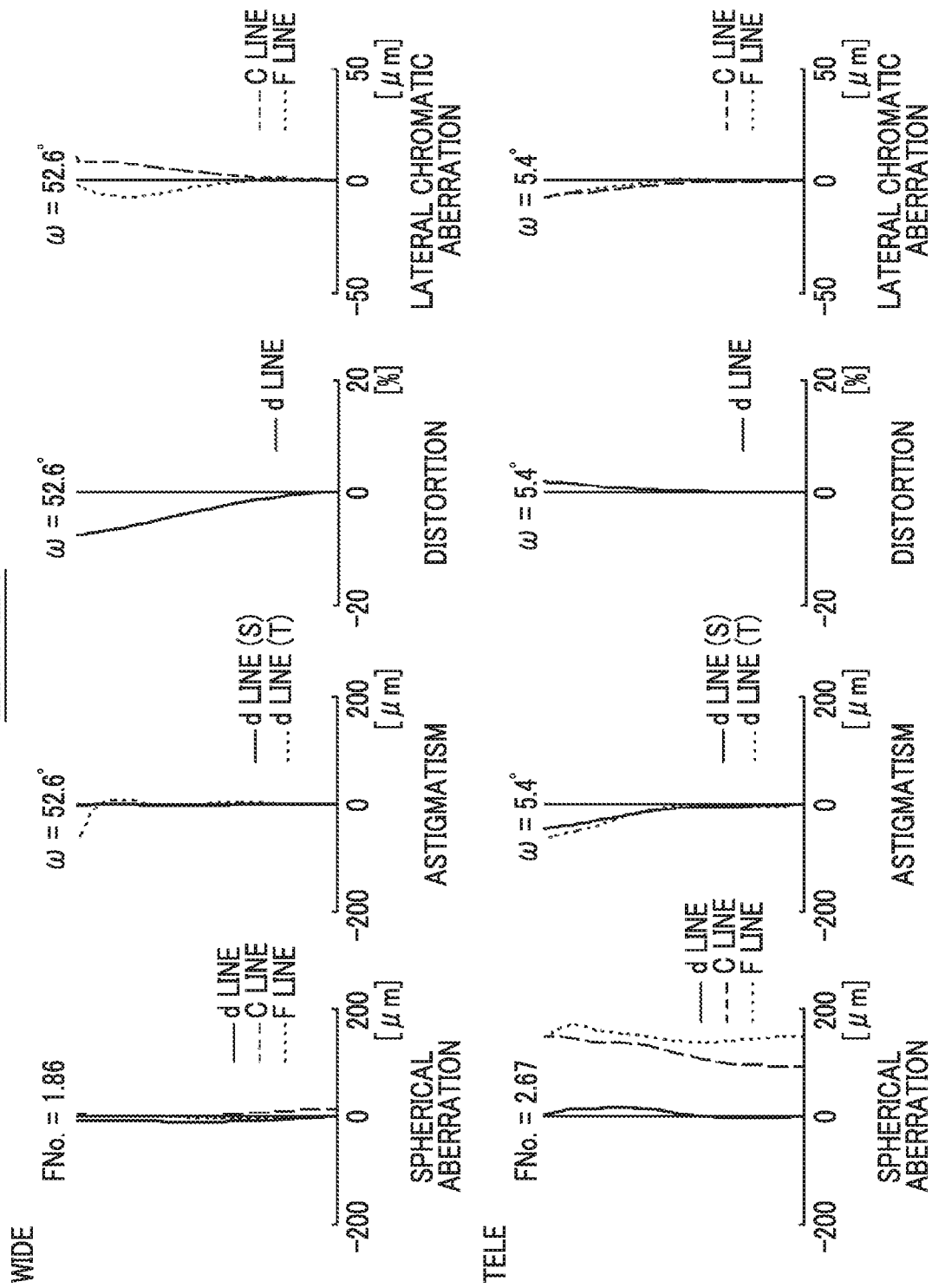
FIG. 4 is a diagram of aberrations of the zoom lens of Example 1 of the present invention, where the diagram includes spherical aberration diagram, astigmatism diagram, distortion diagram, and lateral chromatic aberration diagram, in order from the left side thereof.

Hereinafter, embodiments of the present invention will be described with reference to drawings. FIG. 1 is a cross-sectional view illustrating a configuration and an optical path of a zoom lens according to an embodiment of the present invention, and corresponds to Example 1 to be described later. FIG. 1 shows a situation where an infinite object is in focus, where the left side thereof is the object side and the right side thereof is the image side, and a wide-angle end state is shown at the top thereof indicated by WIDE and a telephoto end state is shown at the bottom indicated by TELE. In FIG. 1, the on-axis rays B0$w$ and the off-axis rays B1$w$ with the maximum angle of view at the wide-angle end state are shown as the optical paths, and the on-axis rays B0$t$ and the off-axis rays B1$t$ with the maximum angle of view at the telephoto end state are shown as the optical paths.

The zoom lens substantially consists of, in order from the object side to the image side along the optical axis Z: a first lens group G1 that has a positive refractive power and remains stationary with respect to an image plane Sim during zooming; a second lens group G2 that has a negative refractive power and moves in a direction of an optical axis Z during zooming; a third lens group G3 that has a negative refractive power and moves in the direction of the optical axis Z during zooming; an aperture stop St; a fourth lens group G4 that has a positive refractive power and remains stationary with respect to the image plane Sim during zooming. It should be noted that the aperture stop St shown in FIG. 1 does not necessarily indicate its size and shape, and indicates a position of the stop on the optical axis Z.

In order to apply the zoom lens to an imaging apparatus, it is preferable to provide various filters, a prism, and/or a protective cover glass based on specification of the imaging apparatus. With those considered, FIG. 1 shows an example where plane-parallel-plate-like optical members P1 to P3 are disposed between the lens system and the image plane Sim. However, positions of the optical members P1 to P3 are not limited to those shown in FIG. 1, and it is also possible to adopt a configuration in which at least one of the optical members P1 to P3 is omitted.

In the zoom lens, the second lens group G2 has a main zooming function, and the third lens group G3 performs correction of focal shift caused by zooming. During zooming from the wide-angle end to the telephoto end, the second lens group G2 moves to the image side, the third lens group G3 moves to the object side, and then moves to the image side. The arrows below the second lens group G2 and the third lens group G3 in the upper part of FIG. 1 indicate the schematic movement loci of these lens groups during zooming from the wide-angle end to the telephoto end.

The first lens group G1 substantially consists of, in order from the object side, a first lens group front group G1A that has a negative refractive power and remains stationary with respect to the image plane Sim during focusing, a first lens group intermediate group G1B that has a positive refractive power and moves to the image side during focusing from a distant object to a close-range object, and a first lens group rear group G1C that has a positive refractive power and remains stationary with respect to the image plane Sim during focusing. With such a configuration, it is possible to achieve the wide angle while satisfactorily suppressing change (bleeding) in angle of view during focusing. The arrow below the first lens group intermediate group G1B in the upper part of FIG. 1 indicates the moving direction of the lens group during focusing from a distant object to a close-range object.

In the example shown in FIG. 1, the first lens group front group G1A consists of four lenses LA1 to LA4 in order from the object side, the first lens group intermediate group G1B consists of only one lens LB1, and the first lens group rear group G1C consists of six lenses LC1 to LC6 in order from the object side.

The first lens group front group G1A is configured to have a plurality of negative lenses that are arranged successively from a position closest to the object side and a positive lens that is disposed to be closest to the image side. By providing a negative refractive power to a position closest to the object side, there is an advantage in achieving the wide angle. By assigning the negative refractive power on the object side to the plurality of negative lenses, there is an advantage in satisfactorily correcting spherical aberration and off-axis aberrations caused by achieving the wide angle. In addition, since the first lens group front group G1A includes not only a negative lens but also a positive lens, chromatic aberration is easily balanced.

The first lens group front group G1A may be configured to substantially consist of, in order from the object side, two negative meniscus lenses convex toward the object side, a negative lens, and a positive lens. In such a manner, it is possible to correct the spherical aberration on the telephoto side while suppressing fluctuation in off-axis aberrations caused by zooming and particularly suppressing fluctuation in distortion and/or suppressing fluctuation in field curvature.

The first lens group intermediate group G1B may be configured to substantially consist of only one positive lens. In such a manner, since it is possible to ensure the amount of movement of the lens which moves during focusing, it becomes easy to suppress fluctuation in spherical aberration caused by focusing. In addition, it is possible to reduce the weight of the lens group that moves during focusing.

The first lens group rear group G1C is configured to have one or more negative lenses concave toward the object side. With this configuration, it is possible to effectively correct spherical aberration occurring on the telephoto side.

It is preferable that the first lens group rear group G1C has, successively in order from the position closest to the object side, a biconvex lens, and a negative meniscus lens concave toward the object side. In such a manner, it is possible to effectively correct field curvature on the wide-angle side while correcting spherical aberration on the telephoto side.

The first lens group rear group G1C may be configured to substantially consist of, in order from the object side, a biconvex lens, a negative meniscus lens concave toward the object side, a cemented lens in which a negative lens and a positive lens are cemented in order from the object side, and one or more positive lenses. In such a manner, the positive spherical aberration generated by the negative refractive power of the first lens group front group G1A can be corrected by the positive lens in the first lens group rear group G1C, and the negative spherical aberration that is overcorrected can be corrected by the cemented surface of the cemented lens in the first lens group rear group G1C. In addition, the first lens group rear group G1C has, in order from the object side, a biconvex lens and a negative meniscus lens concave toward the object side. Thereby, it is possible to effectively correct field curvature on the wide-angle side while correcting spherical aberration.

In a case where the first lens group rear group G1C substantially consist of, in order from the object side, a biconvex lens, a negative meniscus lens concave toward the object side, a cemented lens in which a negative lens and a positive lens are cemented in order from the object side, and one or more positive lenses, the first lens group rear group G1C may be configured to substantially consist of six lenses. That is, the first lens group rear group G1C may be configured to substantially consist of, in order from the object side, a biconvex lens, a negative meniscus lens concave toward the object side, a cemented lens in which a negative lens and a positive lens are cemented in order from the object side, and two positive lenses. In such a manner, there is an advantage in satisfactorily correcting spherical aberration as compared with the case where the first lens group rear group G1C has only one positive lens on the image side of the cemented lens. Further, there is an advantage in achieving reduction in size and reduction in costs of the lens system as compared with the case where the first lens group rear group G1C has three or more positive lenses on the image side of the cemented lens.

Then, the zoom lens is configured to satisfy Conditional Expression (1).

$$65 < vn1A2 < 110 \qquad (1)$$

Here, vn1A2 is an Abbe number of the second negative lens from the object side in the first lens group front group at the d line.

By satisfying Conditional Expression (1), it is possible to suppress lateral chromatic aberration occurring particularly in the entire zoom range, particularly in the peripheral portion of the imaging region. By not allowing the result of Conditional Expression (1) to be equal to or less than the lower limit, it becomes easy to correct lateral chromatic aberration occurring particularly in the entire zoom range, particularly in the peripheral portion of the imaging region. By not allowing the result of Conditional Expression (1) to be equal to or greater than the upper limit, it becomes easy to select a material having a relatively high refractive index as the material of the second negative lens from the object side. As a result, it is possible to easily suppress distortion and field curvature.

In order to enhance the effect relating to Conditional Expression (1), it is preferable that Conditional Expression (1-1) is satisfied.

$$70 < vn1A2 < 100 \quad (1\text{-}1)$$

Further, it is preferable to satisfy Conditional Expression (2).

$$18 < vn1Aa - vp1Aa < 40 \quad (2)$$

Here, vn1Aa is an average of Abbe numbers of the negative lenses in the first lens group front group at the d line, and vp1Aa is an average of Abbe numbers of the positive lenses in the first lens group front group at the d line in a case where the first lens group front group has a plurality of positive lenses, and an Abbe number of the positive lens at the d line in a case where the first lens group front group has only one positive lens.

By not allowing the result of Conditional Expression (2) to be equal to or less than the lower limit, it becomes easy to suppress lateral chromatic aberration on the wide-angle side. In a case where it is intended to forcibly correct the lateral chromatic aberration on the wide-angle side, the absolute value of the radius of curvature of each of lenses composing the first lens group front group G1A becomes small. As a result, it becomes difficult to correct high order aberrations, particularly high order spherical aberration, and it becomes difficult to achieve high optical performance in the entire zoom range. It should be noted that the term "high order" described herein means 5th or more order. By not allowing the result of Conditional Expression (2) to be equal to or greater than the upper limit, it becomes easy to suppress longitudinal chromatic aberration on the telephoto side. Further, by not allowing the result of Conditional Expression (2) to be equal to or greater than the upper limit, it is possible to prevent the Abbe number of the negative lens composing the first lens group front group G1A from becoming large, and it is possible to prevent the refractive index of these negative lenses from being lowered. As a result, it becomes easy to suppress fluctuation in off-axis aberrations caused by zooming, particularly fluctuation in distortion and/or fluctuation in field curvature.

In order to enhance the effect relating to Conditional Expression (2), it is more preferable that Conditional Expression (2-1) is satisfied.

$$23 < vn1Aa - vp1Aa < 35 \quad (2\text{-}1)$$

It is preferable that a lens surface closest to the object side in the first lens group front group G1A has an aspheric shape which has a positive refractive power in the vicinity of the optical axis Z such that the positive refractive power is stronger at a position closer to a peripheral portion of the lens surface than the vicinity of the optical axis. Further, it is preferable that one of lens surfaces included in the first lens group rear group G1C has an aspheric shape which has a positive refractive power in the vicinity of the optical axis Z such that the positive refractive power is weaker at a position closer to a peripheral portion of the lens surface than the vicinity of the optical axis. By providing the aspheric surface in the above configuration to each of the first lens group front group G1A and the first lens group rear group G1C, it is possible to effectively correct distortion on the wide-angle side, which tends to increase due to wide angle, and it is possible to effectively correct spherical aberration on the telephoto side.

Further, it is preferable that the fourth lens group G4 includes a lens surface having an aspheric shape which has a positive refractive power in the vicinity of the optical axis at a position closer to the object side than an air gap largest in the fourth lens group G4 such that the positive refractive power is weaker at a position closer to a peripheral portion of the lens surface than the vicinity of the optical axis. In this zoom lens, since the second lens group G2 and the third lens group G3 both have negative refractive powers, the rays incident from the third lens group G3 to the fourth lens group G4 are divergent rays. In order to condense the divergent rays toward the image plane Sim in the fourth lens group G4, it is necessary to provide a comparatively strong converging function to the fourth lens group G4. Thus, spherical aberration tends to occur. Therefore, by providing the fourth lens group G4 with the aspheric surface, it is possible to effectively correct spherical aberration in the entire zoom range.

In the example of FIG. 1, the fourth lens group G4 consists of a fourth lens group front group G4A at a position closer to the object side than the largest air gap in the fourth lens group G4 and a fourth lens group rear group G4B at a position closer to the image side than the air gap. The lens surface closest to the object side of the fourth lens group front group G4A has the aspheric shape. Between the fourth lens group front group G4A and the fourth lens group rear group G4B, for example, an extender optical system or the like, which shifts the focal length of the whole system to the long focal point side, can be inserted. By providing the fourth lens group front group G4A with the aspheric surface, it is possible to suppress spherical aberration of rays before the rays are incident into the extender optical system. Therefore, it is possible to effectively correct spherical aberration after insertion of the extender optical system.

The above-mentioned preferred configurations and/or available configurations may be optional combinations, and it is preferable to selectively adopt the configurations in accordance with required specification. According to the present embodiment, it is possible to realize a zoom lens which has a wide angle and has favorable optical performance by suppressing lateral chromatic aberration. It should be noted that the term "wide angle" described herein means that the total angle of view is 90° or more.

Next, numerical examples of the zoom lens of the present invention will be described.

Example 1

A lens configuration and an optical path of a zoom lens of Example 1 are shown in FIG. 1, and a configuration and an illustration method thereof is as described above. Therefore, repeated descriptions are partially omitted herein. The zoom lens of Example 1 consists of, in order from the object side, a first lens group G1, a second lens group G2, a third lens group G3, an aperture stop St, and a fourth lens group G4.

During zooming, the first lens group G1 and the fourth lens group G4 remain stationary with respect to the image plane Sim, and the second lens group G2 and the third lens group G3 move. The first lens group G1 consists of, in order from the object side, a first lens group front group G1A, a first lens group intermediate group G1B, and a first lens group rear group G1C. During focusing, only the first lens group intermediate group G1B moves. It should be noted that the group configuration thereof, the behavior thereof during zooming, and the behavior thereof during focusing are the same as those of the zoom lenses of examples to be described later.

The first lens group front group G1A consists of, in order from the object side, a negative meniscus lens LA1 convex toward the object side in the paraxial region and a negative meniscus lens LA2 convex toward the object side in the paraxial region, a negative meniscus lens LA3 concave toward the object side, and a biconvex lens LA4. The first lens group intermediate group G1B consists of a positive meniscus lens LB1 convex toward the image side. The first lens group rear group G1C consists of, in order from the object side, a biconvex lens LC1, a negative meniscus lens LC2 concave toward the object side, a cemented lens in which a negative meniscus lens LC3 concave toward the image side and a biconvex lens LC4 are cemented in order from the object side, a biconvex lens LC5, and a positive meniscus lens LC6 convex toward the object side.

Table 1 shows basic lens data of the zoom lens of Example 1, Table 2 shows specification and variable surface distances during zooming, and Table 3 shows aspheric surface coefficients thereof. In Table 1, the column of Si shows a surface number i (i=1, 2, 3, . . . ) attached to an i-th surface of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side in a case where the element closest to the object side is regarded as the first element. The column of vdj shows an Abbe number of the j-th element on the basis of the d line.

Here, reference signs of radii of curvature of surface shapes convex toward the object side are set to be positive, and reference signs of radii of curvature of surface shapes convex toward the image side are set to be negative. Table 1 additionally shows the aperture stop St and the optical members P1 to P3. In Table 1, in a place of a surface number of a surface corresponding to the aperture stop St, the surface number and a term of (St) are noted. A value at the bottom place of Di indicates a distance between the image plane Sim and the surface closest to the image side in the table. In Table 1, the variable surface distances, which are variable during zooming, are referenced by the reference signs DD[ ], and are written into places of Di, where object side surface numbers of distances are noted in[ ]. Further, in Table 1, regarding the variable surface distances, which change during focusing, the term (INF) and surface distances in a state where the object at infinity is in focus are noted.

In Table 2, values of the zoom ratio Zr, the focal length f of the whole system, the back focal length Bf in terms of the air conversion distance, the F number FNo., the maximum total angle of view 2ω, and variable surface distance are based on the d line. (°) in the place of 2ω indicates that the unit thereof is a degree. In Table 2, values at the wide-angle end state are shown in the column labeled by WIDE, and values at the telephoto end state are shown in the column labeled by TELE. The values of Tables 1 and 2 are values in a state where the object at infinity is in focus.

In Table 1, the reference sign * is attached to surface numbers of aspheric surfaces, and numerical values of the paraxial radius of curvature are written into the column of the radius of curvature of the aspheric surface. Table 3 shows aspheric surface coefficients of the aspheric surfaces of Example 1. The "E-n" (n: an integer) in numerical values of the aspheric surface coefficients of Table 3 indicates "$\times 10^{-n}$". The aspheric surface coefficients are values of the coefficients KA and Am (m=4, 6, 8, . . . ) in aspheric surface expression represented as the following expression.

$$Zd = \frac{C \times h^2}{1 + \sqrt{1 - KA \times C^2 \times h^2}} + \sum_m Am \times h^m \qquad \text{Numerical Expression 1}$$

Here, Zd is an aspheric surface depth (a length of a perpendicular from a point on an aspheric surface at height h to a plane that is perpendicular to the optical axis and contacts with the vertex of the aspheric surface), h is a height (a length of a perpendicular from the point on the aspheric surface to the optical axis, in the plane that is perpendicular to the optical axis and contacts with the vertex of the aspheric surface), C is a paraxial curvature, and KA and Am are aspheric surface coefficients.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj |
|---|---|---|---|---|
| *1 | 641.66259 | 3.000 | 1.80100 | 34.97 |
| 2 | 33.75559 | 17.000 | | |
| *3 | 123.74146 | 2.000 | 1.49700 | 81.54 |
| 4 | 56.40159 | 16.000 | | |
| 5 | −72.32584 | 1.930 | 1.95375 | 32.32 |
| 6 | −202.10991 | 0.300 | | |
| 7 | 136.61972 | 6.580 | 1.84666 | 23.78 |
| 8 | −277.46991 | 0.75 (INF) | | |
| 9 | −2306.32677 | 6.350 | 1.53775 | 74.70 |
| 10 | −94.09392 | 6.161 (INF) | | |
| 11 | 114.61313 | 7.660 | 1.43875 | 94.66 |
| *12 | −181.77945 | 4.121 | | |
| 13 | −77.04720 | 1.800 | 1.80100 | 34.97 |
| 14 | −126.53361 | 0.120 | | |
| 15 | 184.93960 | 1.800 | 1.95375 | 32.32 |
| 16 | 64.49500 | 16.610 | 1.43875 | 94.66 |
| 17 | −57.48031 | 0.120 | | |
| 18 | 266.75570 | 7.670 | 1.43387 | 95.18 |
| 19 | −90.09519 | 0.120 | | |
| 20 | 54.93968 | 4.520 | 1.72916 | 54.68 |
| 21 | 95.88929 | DD [21] | | |

TABLE 1-continued

Example 1

| Si | Ri | Di | Ndj | vdj |
|---|---|---|---|---|
| 22 | 39.58867 | 0.800 | 2.00100 | 29.13 |
| 23 | 15.50502 | 4.869 | | |
| 24 | −33.46164 | 0.800 | 1.91082 | 35.25 |
| 25 | 81.63500 | 5.020 | 1.80518 | 25.42 |
| 26 | −15.76600 | 0.810 | 1.77250 | 49.60 |
| 27 | 73.45119 | 0.120 | | |
| 28 | 34.32104 | 5.740 | 1.69895 | 30.13 |
| 29 | −17.41600 | 0.800 | 1.95375 | 32.32 |
| 30 | −74.84673 | DD [30] | | |
| 31 | −33.54980 | 0.810 | 1.72916 | 54.68 |
| 32 | 59.17000 | 2.390 | 1.84661 | 23.88 |
| 33 | −1406.19646 | DD [33] | | |
| 34 (St) | ∞ | 1.000 | | |
| *35 | 64.73762 | 5.710 | 1.80610 | 40.88 |
| 36 | −72.62275 | 0.120 | | |
| 37 | 131.85587 | 5.180 | 1.51742 | 52.43 |
| 38 | −44.21500 | 1.000 | 1.95375 | 32.32 |
| 39 | −230.81910 | 34.525 | | |
| 40 | 251.98617 | 3.390 | 1.84661 | 23.88 |
| 41 | −68.85375 | 1.398 | | |
| 42 | 41.85229 | 6.010 | 1.58913 | 61.13 |
| 43 | −51.64100 | 1.000 | 1.95375 | 32.32 |
| 44 | 26.58227 | 1.645 | | |
| 45 | 30.92090 | 9.460 | 1.53775 | 74.70 |
| 46 | −26.31100 | 1.000 | 1.95375 | 32.32 |
| 47 | −89.90422 | 0.120 | | |
| 48 | 69.93761 | 5.690 | 1.48749 | 70.24 |
| 49 | −35.79182 | 0.200 | | |
| 50 | ∞ | 1.000 | 1.51633 | 64.14 |
| 51 | ∞ | 5.419 | | |
| 52 | ∞ | 33.000 | 1.60859 | 46.44 |
| 53 | ∞ | 13.200 | 1.51633 | 64.05 |
| 54 | ∞ | 5.503 | | |

TABLE 2

Example 1

| | WIDE | TELE |
|---|---|---|
| Zr | 1.0 | 12.6 |
| f | 4.668 | 58.586 |
| Bf | 41.002 | 41.002 |
| FNo. | 1.86 | 2.67 |
| 2ω (°) | 105.2 | 10.8 |
| DD [21] | 0.726 | 47.183 |
| DD [30] | 44.474 | 5.772 |
| DD [33] | 9.480 | 1.725 |

TABLE 3

Example 1

| | Surface Number | | | |
|---|---|---|---|---|
| | 1 | 3 | 12 | 35 |
| KA | 1.0000000E+00 | 1.0000000E+00 | 1.0000000E+00 | 1.0000000E+00 |
| A4 | 2.1935986E−06 | −4.8514385E−07 | 1.2227839E−06 | −2.8441059E−06 |
| A6 | −5.0602429E−10 | −8.4353254E−11 | −9.0152102E−11 | −6.5929982E−11 |
| A8 | 9.2543372E−14 | −1.8537680E−12 | −3.6643047E−13 | 2.5648563E−11 |
| A10 | −2.1340794E−17 | 2.7757879E−15 | 1.2047269E−15 | −3.2693830E−13 |
| A12 | 1.3094908E−20 | −5.6973394E−18 | −4.2351771E−18 | 2.5112072E−15 |
| A14 | −8.8381246E−25 | 1.1850385E−20 | 9.0596803E−21 | −1.1779118E−17 |
| A16 | −2.7337631E−27 | −1.3306500E−23 | −1.1002102E−23 | 3.2475601E−20 |
| A18 | 1.2809320E−30 | 7.2223093E−27 | 7.0253554E−27 | −4.8092328E−23 |
| A20 | −1.8339686E−34 | −1.5476582E−30 | −1.8330673E−30 | 2.9425260E−26 |

FIG. 4 shows aberration diagrams in a state where an object at infinity is brought into focus through the zoom lens of Example 1. In order from the left side in the upper part labeled by WIDE of FIG. 4, spherical aberration, astigmatism, distortion, and lateral chromatic aberration (chromatic aberration of magnification) at the wide-angle end are shown. In order from the left side in the lower part labeled by TELE, spherical aberration, astigmatism, distortion, and lateral chromatic aberration at the telephoto end are shown. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 5:
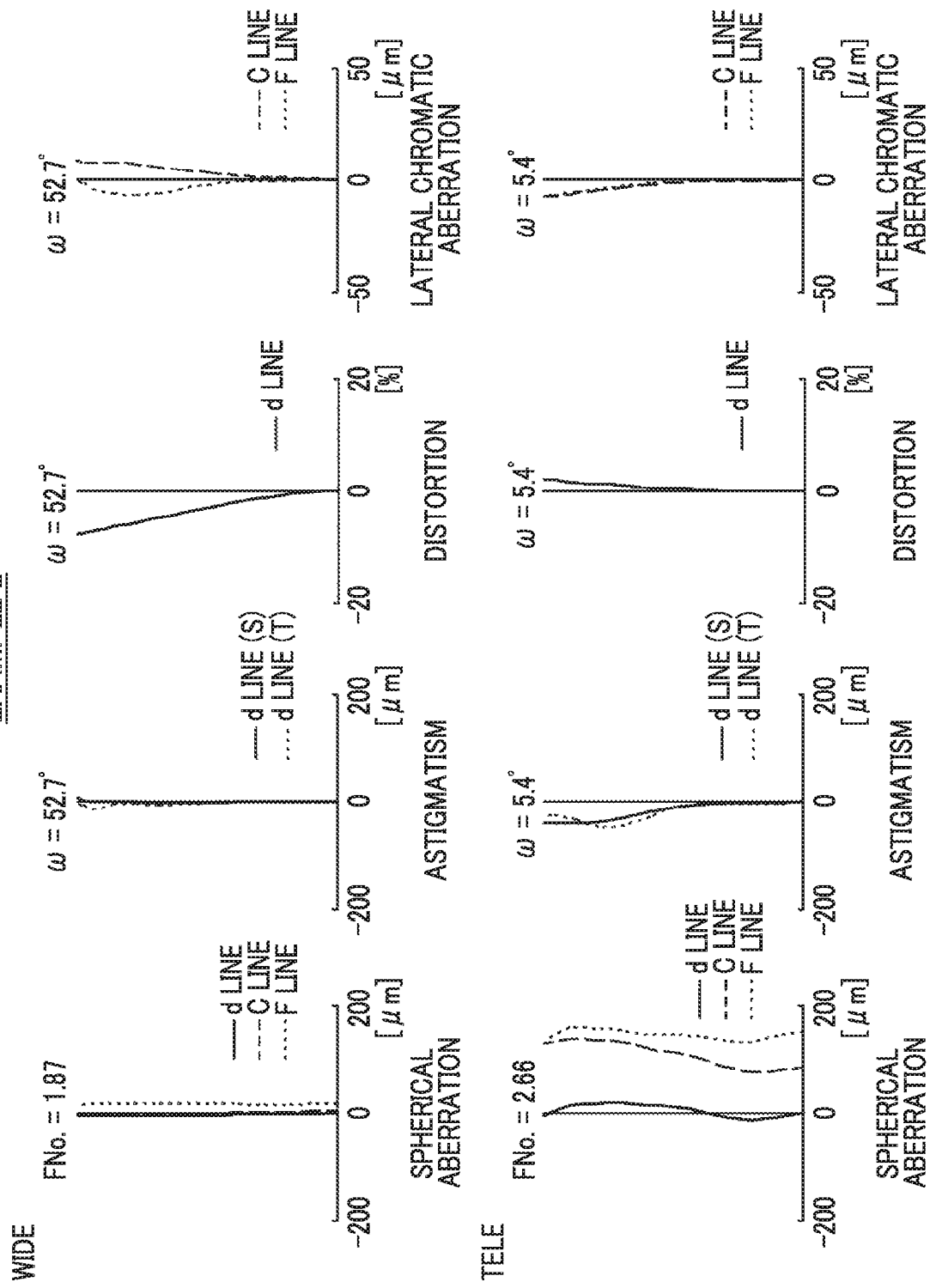
FIG. 5 is a diagram of aberrations of the zoom lens of Example 2 of the present invention, where the diagram includes spherical aberration diagram, astigmatism diagram, distortion diagram, and lateral chromatic aberration diagram, in order from the left side thereof.

FIG. 2 shows a lens configuration and an optical path of a zoom lens of Example 2. The first lens group front group G1A of Example 2 consists of lenses LA1 to LA4 in order from the object side, the first lens group intermediate group G1B consists of a lens LB1, the first lens group rear group G1C consists of lenses LC1 to LC6 in order from the object side. The shapes of the lenses LA1 to LA4, the lens LB1, and the lenses LC1 to LC6 of Example 2 are the same as those of Example 1. Table 4 shows basic lens data of the zoom lens of Example 2, Table 5 shows specification and variable surface distance during zooming, and Table 6 shows aspheric surface coefficients. FIG. 5 shows aberration diagrams.

TABLE 4

Example 2

| Si | Ri | Di | Ndj | νdj |
|---|---|---|---|---|
| *1 | 476.51977 | 3.000 | 1.83400 | 37.16 |
| 2 | 32.86580 | 17.078 | | |
| *3 | 105.85713 | 2.000 | 1.43875 | 94.66 |
| 4 | 60.18363 | 13.477 | | |
| 5 | −70.32843 | 1.890 | 1.95375 | 32.32 |
| 6 | −218.63604 | 0.300 | | |
| 7 | 129.98129 | 6.561 | 1.85478 | 24.80 |
| 8 | −315.95408 | 0.75 (INF) | | |
| 9 | −12078.01625 | 6.852 | 1.55032 | 75.50 |
| 10 | −89.07884 | 5.788 (INF) | | |
| 11 | 142.53045 | 6.565 | 1.43875 | 94.66 |
| *12 | −200.49676 | 6.290 | | |
| 13 | −58.67961 | 1.800 | 1.76200 | 40.10 |
| 14 | −82.49879 | 0.120 | | |
| 15 | 320.62868 | 1.800 | 1.95375 | 32.32 |
| 16 | 74.84878 | 16.550 | 1.43875 | 94.66 |
| 17 | −52.07082 | 0.120 | | |
| 18 | 154.29349 | 8.462 | 1.43387 | 95.18 |
| 19 | −98.11492 | 0.120 | | |
| 20 | 57.54702 | 4.257 | 1.72916 | 54.68 |
| 21 | 98.10885 | DD [21] | | |
| 22 | 42.38795 | 0.800 | 2.00100 | 29.13 |
| 23 | 15.96569 | 4.677 | | |
| 24 | −34.55337 | 0.800 | 1.90043 | 37.37 |
| 25 | 37.86161 | 5.494 | 1.80518 | 25.42 |
| 26 | −17.02073 | 0.810 | 1.75500 | 52.32 |
| 27 | 87.47896 | 0.120 | | |
| 28 | 34.76891 | 5.541 | 1.67270 | 32.10 |
| 29 | −18.70119 | 0.800 | 1.95375 | 32.32 |
| 30 | −81.54672 | DD [30] | | |
| 31 | −34.43854 | 0.810 | 1.74100 | 52.64 |
| 32 | 65.54307 | 2.307 | 1.85896 | 22.73 |
| 33 | −748.11790 | DD [33] | | |
| 34 (St) | ∞ | 1.477 | | |
| *35 | 77.39278 | 5.819 | 1.83481 | 42.72 |
| 36 | −58.35191 | 0.120 | | |
| 37 | 601.74223 | 4.453 | 1.51823 | 58.90 |
| 38 | −38.66198 | 1.000 | 1.95375 | 32.32 |
| 39 | −123.50710 | 36.404 | | |
| 40 | 578.11412 | 4.655 | 1.89286 | 20.36 |
| 41 | −63.49414 | 0.312 | | |
| 42 | 48.67612 | 5.891 | 1.67790 | 55.34 |
| 43 | −46.03693 | 1.000 | 1.95375 | 32.32 |
| 44 | 25.59258 | 1.457 | | |
| 45 | 28.79385 | 8.428 | 1.55032 | 75.50 |
| 46 | −25.99133 | 1.000 | 1.95375 | 32.32 |
| 47 | −142.64072 | 0.120 | | |
| 48 | 81.46972 | 5.565 | 1.55332 | 71.68 |
| 49 | −35.70397 | 0.200 | | |
| 50 | ∞ | 1.000 | 1.51633 | 64.14 |
| 51 | ∞ | 4.940 | | |
| 52 | ∞ | 33.000 | 1.60859 | 46.44 |
| 53 | ∞ | 13.200 | 1.51633 | 64.05 |
| 54 | ∞ | 5.500 | | |

TABLE 5

Example 2

| | WIDE | TELE |
|---|---|---|
| Zr | 1.0 | 12.6 |
| f | 4.668 | 58.586 |
| Bf | 40.520 | 40.520 |
| FNo. | 1.87 | 2.66 |
| 2ω (°) | 105.4 | 10.8 |
| DD [21] | 0.661 | 47.937 |
| DD [30] | 45.560 | 5.895 |
| DD [33] | 9.331 | 1.720 |

TABLE 6

Example 2

| | Surface Number | |
|---|---|---|
| | 1 | 3 |
| KA | 1.0000000E+00 | 1.0000000E+00 |
| A4 | 2.4267425E−06 | −9.4010461E−07 |
| A6 | −7.0134118E−10 | 2.1294412E−12 |
| A8 | 1.7659461E−13 | −1.0611618E−12 |
| A10 | −1.8790040E−17 | 8.7245246E−16 |

| | Surface Number | |
|---|---|---|
| | 12 | 35 |
| KA | 1.0000000E+00 | 1.0000000E+00 |
| A4 | 1.2207910E−06 | −2.7759711E−06 |
| A6 | 6.6102882E−10 | 5.5199911E−10 |
| A8 | −6.2782193E−12 | 1.5653845E−11 |
| A10 | 2.8898205E−14 | −2.1119134E−13 |
| A12 | −8.2450390E−17 | 1.5581148E−15 |
| A14 | 1.4567312E−19 | −6.8216783E−18 |
| A16 | −1.5556161E−22 | 1.7393773E−20 |
| A18 | 9.1970237E−26 | −2.3776476E−23 |
| A20 | −2.3101539E−29 | 1.3434060E−26 |

Example 3

Figure 6:
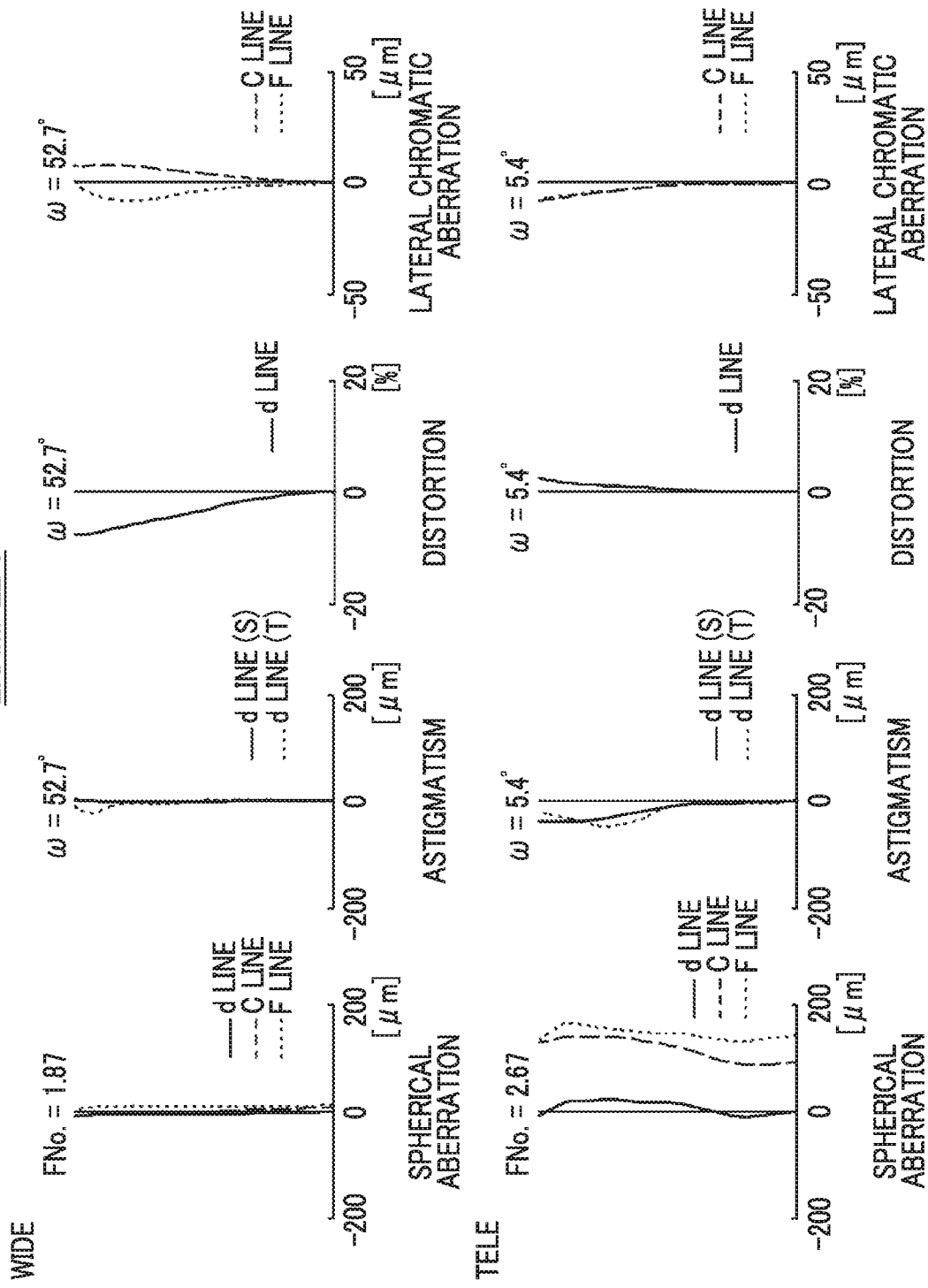
FIG. 6 is a diagram of aberrations of the zoom lens of Example 3 of the present invention, where the diagram includes spherical aberration diagram, astigmatism diagram, distortion diagram, and lateral chromatic aberration diagram, in order from the left side thereof.

FIG. 3 shows a lens configuration and an optical path of a zoom lens of Example 3. The first lens group front group G1A of Example 3 consists of lenses LA1 to LA4 in order from the object side, the first lens group intermediate group G1B consists of a biconvex lens LB1, the first lens group rear group G1C consists of lenses LC1 to LC6 in order from the object side. The shapes of the lenses LA1 to LA4 and the lenses LC1 to LC6 of Example 3 are the same as those of Example 1. Table 7 shows basic lens data of the zoom lens of Example 3, Table 8 shows specification and variable surface distance during zooming, and Table 9 shows aspheric surface coefficients. FIG. 6 shows aberration diagrams.

TABLE 7

Example 3

| Si | Ri | Di | Ndj | νdj |
|---|---|---|---|---|
| *1 | 491.72708 | 3.000 | 1.80440 | 39.59 |
| 2 | 32.48646 | 17.015 | | |
| *3 | 102.19013 | 2.000 | 1.53775 | 74.70 |
| 4 | 59.57256 | 13.998 | | |
| 5 | −64.01924 | 1.893 | 1.95375 | 32.32 |
| 6 | −170.06293 | 0.300 | | |
| 7 | 132.61540 | 6.338 | 1.84666 | 23.78 |
| 8 | −351.39852 | 0.85 (INF) | | |
| 9 | 32702.58028 | 7.877 | 1.55032 | 75.50 |
| 10 | −77.34602 | 4.932 (INF) | | |
| 11 | 165.64413 | 6.958 | 1.43875 | 94.66 |
| *12 | −144.37368 | 6.137 | | |
| 13 | −55.04825 | 1.800 | 1.72342 | 37.95 |
| 14 | −77.27798 | 0.120 | | |
| 15 | 421.73782 | 1.800 | 1.95375 | 32.32 |
| 16 | 76.15782 | 16.478 | 1.43875 | 94.66 |
| 17 | −52.03778 | 0.120 | | |
| 18 | 557.62883 | 7.432 | 1.43387 | 95.18 |
| 19 | −80.92849 | 0.120 | | |
| 20 | 52.75914 | 4.855 | 1.72916 | 54.68 |
| 21 | 93.97302 | DD [21] | | |
| 22 | 49.43700 | 0.800 | 2.00100 | 29.13 |
| 23 | 16.35852 | 4.456 | | |
| 24 | −36.02716 | 0.800 | 1.91082 | 35.25 |
| 25 | 33.33899 | 5.878 | 1.80518 | 25.42 |

TABLE 7-continued

Example 3

| Si | Ri | Di | Ndj | vdj |
|---|---|---|---|---|
| 26 | −16.03900 | 0.810 | 1.75500 | 52.32 |
| 27 | 97.81106 | 0.120 | | |
| 28 | 35.46062 | 5.431 | 1.66680 | 33.05 |
| 29 | −19.14171 | 0.800 | 1.95375 | 32.32 |
| 30 | −75.77618 | DD [30] | | |
| 31 | −33.66224 | 0.810 | 1.72916 | 54.68 |
| 32 | 57.28783 | 2.270 | 1.92119 | 23.96 |
| 33 | 708.34091 | DD [33] | | |
| 34 (St) | ∞ | 1.255 | | |
| *35 | 76.23532 | 5.902 | 1.78800 | 47.37 |
| 36 | −56.75054 | 0.120 | | |
| 37 | 170.34200 | 5.116 | 1.54072 | 47.23 |
| 38 | −38.96773 | 1.000 | 1.95375 | 32.32 |
| 39 | −166.16567 | 35.877 | | |
| 40 | 452.20173 | 4.426 | 1.92286 | 20.88 |
| 41 | −62.45449 | 0.308 | | |
| 42 | 47.89196 | 6.201 | 1.64000 | 60.08 |
| 43 | −41.83390 | 1.000 | 1.95375 | 32.32 |
| 44 | 26.02421 | 1.373 | | |
| 45 | 29.19409 | 8.370 | 1.55032 | 75.50 |
| 46 | −25.58576 | 1.000 | 1.95375 | 32.32 |
| 47 | −114.88148 | 0.120 | | |
| 48 | 87.09456 | 5.632 | 1.51633 | 64.14 |
| 49 | −33.33806 | 0.200 | | |
| 50 | ∞ | 1.000 | 1.51633 | 64.14 |
| 51 | ∞ | 4.940 | | |
| 52 | ∞ | 33.000 | 1.60859 | 46.44 |
| 53 | ∞ | 13.200 | 1.51633 | 64.05 |
| 54 | ∞ | 5.503 | | |

TABLE 8

Example 3

| | WIDE | TELE |
|---|---|---|
| Zr | 1.0 | 12.6 |
| f | 4.669 | 58.600 |
| Bf | 40.524 | 40.524 |
| FNo. | 1.87 | 2.67 |
| 2ω (°) | 105.4 | 10.8 |
| DD [21] | 0.946 | 47.877 |
| DD [30] | 44.589 | 5.525 |
| DD [33] | 9.755 | 1.888 |

TABLE 9

Example 3

| | Surface Number | |
|---|---|---|
| | 1 | 3 |
| KA | 1.0000000E+00 | 1.0000000E+00 |
| A4 | 2.4289698E−06 | −8.6137715E−07 |
| A6 | −7.0948734E−10 | −8.8814847E−11 |
| A8 | 1.8400369E−13 | −8.1921163E−13 |
| A10 | −1.9841319E−17 | 6.5175431E−16 |

| | Surface Number | |
|---|---|---|
| | 12 | 35 |
| KA | 1.0000000E+00 | 1.0000000E+00 |
| A4 | 1.2893137E−06 | −2.8554557E−06 |
| A6 | 5.3694364E−10 | 1.1390179E−09 |
| A8 | −5.3621581E−12 | 1.4753332E−12 |
| A10 | 2.4736230E−14 | −2.2307454E−14 |
| A12 | −7.0594049E−17 | 1.1238767E−16 |
| A14 | 1.2455064E−19 | −1.8509580E−19 |
| A16 | −1.3275621E−22 | −6.9229294E−22 |

TABLE 9-continued

Example 3

| A18 | 7.8329842E−26 | 3.1751527E−24 |
| A20 | −1.9636133E−29 | −3.4736721E−27 |

Table 10 shows values corresponding to Conditional Expressions (1) and (2) of the zoom lenses of Examples 1 to 3.

TABLE 10

Expression Number

| Expression Number | | Example 1 | Example 2 | Example 3 |
|---|---|---|---|---|
| (1) | vn1A2 | 81.54 | 94.66 | 74.70 |
| (2) | vn1Aa−vp1Aa | 25.83 | 29.91 | 25.09 |

As can be seen from the above data, in the zoom lens of Examples 1 to 3, the wide angle is achieved such that the total angle of view is equal to or greater than 105°, and various aberrations including lateral chromatic aberration are satisfactorily corrected, whereby high optical performance is achieved.

Figure 7:
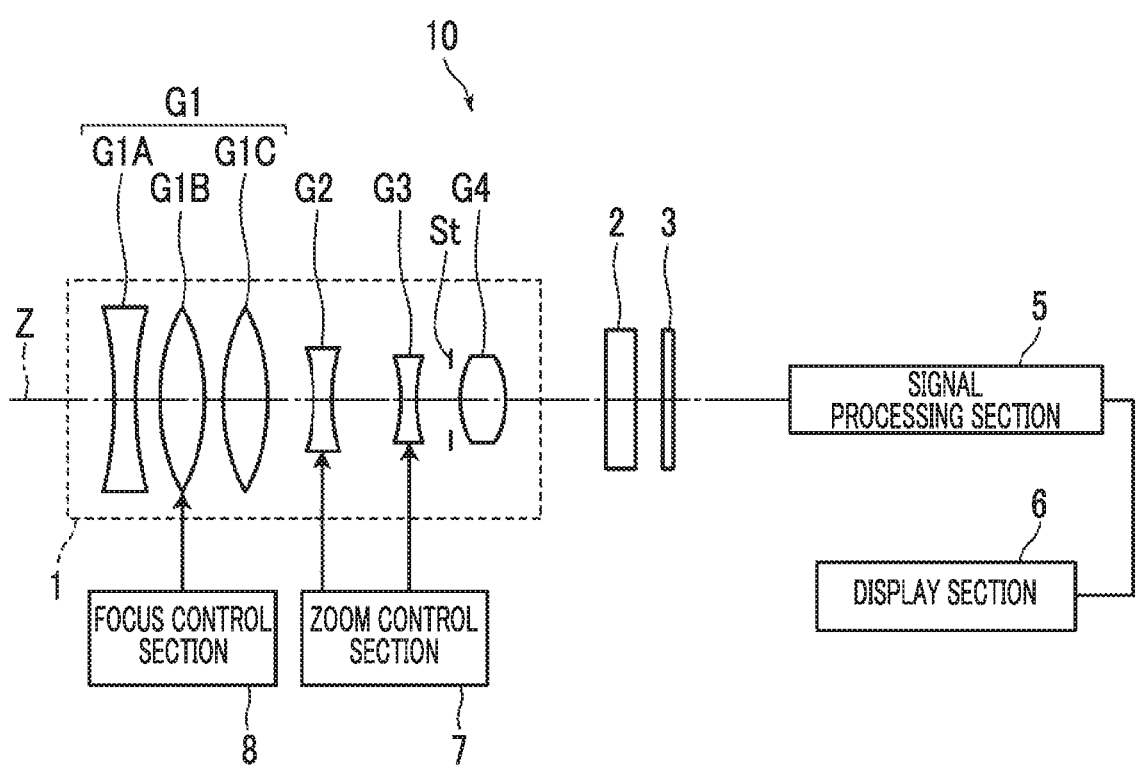
FIG. 7 is a schematic configuration diagram of an imaging apparatus according to an embodiment of the present invention.

Next, an imaging apparatus according to an embodiment of the present invention will be described. FIG. 7 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 7 schematically shows the first lens group front group G1A, the first lens group intermediate group G1B, the first lens group rear group G1C, the second to fourth lens groups G2 to G4, and the aperture stop St included in the zoom lens 1. The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 7 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the number of lenses included in each lens group and the radius of curvature, the surface spacing, the refractive index, the Abbe number, and the aspheric surface coefficient of each lens are not limited to the values shown in the numerical examples, and different values may be used therefor. Explanation of References 1: zoom lens
2: filter
3: imaging element
5: signal processing section
6: display section
7: zoom control section
8: focus control section
10: imaging apparatus
B0t, B0w: on-axis rays
B1t, B1w: off-axis rays
G1: first lens group
G1A: first lens group front group
G1B: first lens group intermediate group
G1C: first lens group rear group
G2: second lens group
G3: third lens group
G4: fourth lens group
G4A: fourth lens group front group
G4B: fourth lens group rear group
LA1 to LA4, LB1, LC1 to LC6: lens
P1 to P3: optical member
Sim: image plane
St: aperture stop
Z: optical axis

What is claimed is:

1. A zoom lens consisting of, in order from an object side:
a first lens group that has a positive refractive power and remains stationary with respect to an image plane during zooming;
a second lens group that has a negative refractive power and moves in a direction of an optical axis during zooming;
a third lens group that has a negative refractive power and moves in the direction of the optical axis during zooming;
a stop;
a fourth lens group that has a positive refractive power and remains stationary with respect to the image plane during zooming,
wherein the first lens group includes, in order from the object side, a first lens group front group that has a negative refractive power and remains stationary with respect to the image plane during focusing, a first lens group intermediate group that has a positive refractive power and moves to the image side during focusing from a distant object to a close-range object, and a first lens group rear group that has a positive refractive power and remains stationary with respect to the image plane during focusing,
wherein the first lens group front group has two negative meniscus lenses convex toward the object side and a negative lens that are arranged successively from a position closest to the object side, and a positive lens that is disposed to be closest to the image side,
wherein the first lens group rear group has one or more negative lenses concave toward the object side, and
wherein Conditional Expression (1) is satisfied, $$65 < vn1A2 < 110 \qquad (1),$$

where $vn1A2$ is an Abbe number of a second negative lens from the object side in the first lens group front group at the d line.

2. The zoom lens according to claim 1, wherein Conditional Expression (2) is satisfied, $$18 < vn1Aa - vp1Aa < 40 \qquad (2),$$

where $vn1Aa$ is an average of Abbe numbers of the negative lenses in the first lens group front group at the d line, and
$vp1Aa$ is an average of Abbe numbers of the positive lenses in the first lens group front group at the d line in a case where the first lens group front group has a plurality of positive lenses, and an Abbe number of the positive lens at the d line in a case where the first lens group front group has only one positive lens.

3. The zoom lens according to claim 2, wherein the first lens group rear group has, successively in order from the position closest to the object side, a biconvex lens, and a negative meniscus lens concave toward the object side.

4. The zoom lens according to claim 3, wherein the first lens group rear group includes, in order from the object side, a biconvex lens, a negative meniscus lens concave toward the object side, a cemented lens in which a negative lens and a positive lens are cemented in order from the object side, and one or more positive lenses.

5. The zoom lens according to claim 4, wherein the first lens group rear group includes six lenses.

6. The zoom lens according to claim 2, wherein the first lens group rear group includes, in order from the object side, a biconvex lens, a negative meniscus lens concave toward the object side, a cemented lens in which a negative lens and a positive lens are cemented in order from the object side, and one or more positive lenses.

7. The zoom lens according to claim 6, wherein the first lens group rear group includes six lenses.

8. The zoom lens according to claim 2, wherein the first lens group intermediate group includes only one positive lens.

9. The zoom lens according to claim 1, wherein the first lens group rear group has, successively in order from the position closest to the object side, a biconvex lens, and a negative meniscus lens concave toward the object side.

10. The zoom lens according to claim 9, wherein the first lens group rear group includes, in order from the object side, a biconvex lens, a negative meniscus lens concave toward the object side, a cemented lens in which a negative lens and a positive lens are cemented in order from the object side, and one or more positive lenses.

11. The zoom lens according to claim 10, wherein the first lens group rear group includes six lenses.

12. The zoom lens according to claim 9, wherein the first lens group intermediate group includes only one positive lens.

13. The zoom lens according to claim 1, wherein the first lens group rear group includes, in order from the object side, a biconvex lens, a negative meniscus lens concave toward the object side, a cemented lens in which a negative lens and a positive lens are cemented in order from the object side, and one or more positive lenses.

14. The zoom lens according to claim 13, wherein the first lens group rear group includes six lenses.

15. The zoom lens according to claim 1, wherein the first lens group intermediate group includes only one positive lens.

16. The zoom lens according to claim 1,
wherein a lens surface closest to the object side in the first lens group front group has an aspheric shape which has a positive refractive power in the vicinity of the optical axis such that the positive refractive power is stronger at a position closer to a peripheral portion of the lens surface than the vicinity of the optical axis, and wherein one of lens surfaces included in the first lens group rear group has an aspheric shape which has a positive refractive power in the vicinity of the optical axis such that the positive refractive power is weaker at a position closer to a peripheral portion of the lens surface than the vicinity of the optical axis.

17. The zoom lens according to claim 1, wherein the fourth lens group includes a lens surface having an aspheric shape which has a positive refractive power in the vicinity of the optical axis at a position closer to the object side than an air gap largest in the fourth lens group such that the positive refractive power is weaker at a position closer to a peripheral portion of the lens surface than the vicinity of the optical axis.

18. The zoom lens according to claim 1, wherein Conditional Expression (1-1) is satisfied, $$70 < vn1A2 < 100 \tag{1-1}.$$

19. The zoom lens according to claim 1, wherein Conditional Expression (2-1) is satisfied, $$23 < vn1Aa - vp1Aa < 35 \tag{2-1}$$

where vn1Aa is an average of Abbe numbers of the negative lenses in the first lens group front group at the d line, and vp1Aa is an average of Abbe numbers of the positive lenses in the first lens group front group at the d line in a case where the first lens group front group has a plurality of positive lenses, and an Abbe number of the positive lens at the d line in a case where the first lens group front group has only one positive lens.

20. An imaging apparatus comprising the zoom lens according to claim 1.

* * * * *